US011582743B2

(12) United States Patent
Davydov et al.

(10) Patent No.: US 11,582,743 B2
(45) Date of Patent: Feb. 14, 2023

(54) CONTROL CHANNEL TRANSMISSION IN NEW RADIO ACCESS TECHNOLOGIES USING COMMON SEARCH SPACE

(71) Applicant: Apple Inc., Cupertino, CA (US)

(72) Inventors: Alexei Davydov, Nizhny Novgorod (RU); Wook Bong Lee, Pleasanton, CA (US); Hong He, Sunnyvale, CA (US); Seung Hee Han, San Jose, CA (US); Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/388,325

(22) Filed: Jul. 29, 2021

(65) Prior Publication Data

US 2021/0360599 A1 Nov. 18, 2021

Related U.S. Application Data

(63) Continuation of application No. 16/467,549, filed as application No. PCT/US2017/035899 on Jun. 5, 2017, now Pat. No. 11,082,966.
(Continued)

(51) Int. Cl.
H04W 72/04 (2009.01)
H04B 7/06 (2006.01)
(Continued)

(52) U.S. Cl.
CPC ........ H04W 72/042 (2013.01); H04B 7/0617 (2013.01); H04B 7/086 (2013.01);
(Continued)

(58) Field of Classification Search
CPC ........... H04W 72/042; H04W 72/0446; H04W 24/08; H04L 5/0091; H04L 5/0055;
(Continued)

(56) References Cited

U.S. PATENT DOCUMENTS 9,572,063 B2 2/2017 Etemad et al.
10,666,334 B2 5/2020 Xiang et al.
(Continued)

OTHER PUBLICATIONS

International Search Report and Written Opinion dated Nov. 10, 2017 for PCT Application PCT/US2017/035899.
(Continued)

Primary Examiner — Wei Zhao
(74) Attorney, Agent, or Firm — Eschweiler & Potashnik, LLC

(57) ABSTRACT

Techniques for transmitting and receiving beamformed transmission(s) of a common search space of a DL (Downlink) control channel are discussed. One example embodiment that can be employed at a UE (User Equipment) comprises processing circuitry configured to: select a set of receive beamforming weights for a DL (Downlink) control channel; and decode one or more control channel sets from a common search space of the DL control channel, wherein each control channel set of the one or more control channel sets is mapped to an associated symbol of one or more symbols of a slot, wherein each control channel set of the one or more control channel sets has an associated transmit beamforming, and wherein each control channel set of the one or more control channel sets comprises a common set of control information.

20 Claims, 9 Drawing Sheets

Related U.S. Application Data

(60) Provisional application No. 62/372,481, filed on Aug. 9, 2016.

(51) Int. Cl.
  *H04W 24/08* (2009.01)
  *H04L 5/00* (2006.01)
  *H04B 7/08* (2006.01)

(52) U.S. Cl.
  CPC .......... *H04L 5/0023* (2013.01); *H04L 5/0028* (2013.01); *H04L 5/0091* (2013.01); *H04W 24/08* (2013.01); *H04L 5/0026* (2013.01); *H04L 5/0048* (2013.01); *H04L 5/0055* (2013.01)

(58) Field of Classification Search
  CPC ... H04L 5/0048; H04L 5/0028; H04L 5/0026; H04L 5/0023; H04L 5/002; H04B 7/0617; H04B 7/086
  See application file for complete search history.

(56) References Cited

U.S. PATENT DOCUMENTS

| | | | |
|---|---|---|---|
| 11,147,050 B2* | 10/2021 | Papasakellariou | H04W 24/00 |
| 2012/0113866 A1* | 5/2012 | Tenny | H04W 24/10 370/254 |
| 2013/0286960 A1 | 10/2013 | Li et al. | |
| 2014/0177561 A1 | 6/2014 | Yu et al. | |
| 2019/0268119 A1* | 8/2019 | Nogami | H04L 5/0094 |
| 2020/0145079 A1 | 5/2020 | Marinier et al. | |

OTHER PUBLICATIONS

International Preliminary Report on Patentability dated Feb. 12, 2019 for PCT Application PCT/US2017/035899.

Non-Final Office Action dated Dec. 14, 2020 in connection with U.S. Appl. No. 16/467,549.

Notice of Allowance dated Mar. 26, 2021 in connection with U.S. Appl. No. 16/467,549.

* cited by examiner

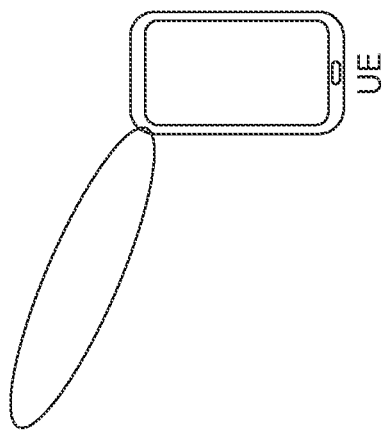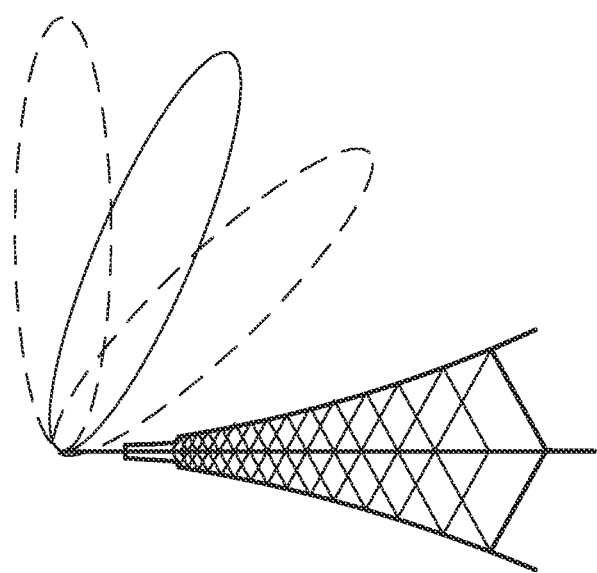
FIG. 6

CONTROL CHANNEL TRANSMISSION IN NEW RADIO ACCESS TECHNOLOGIES USING COMMON SEARCH SPACE

REFERENCE TO RELATED APPLICATIONS

This application is a Continuation Patent Application which claims priority to U.S. patent application Ser. No. 16/467,549 filed Jun. 7, 2019, which is a National Phase entry application of International Patent Application No. PCT/US2017/035899 filed Jun. 5, 2017, which claims priority to U.S. Provisional Application No. 62/372,481 filed Aug. 9, 2016, entitled "CONTROL CHANNEL TRANSMISSION IN NEW RADIO ACCESS TECHNOLOGIES USING COMMON SEARCH SPACE" in the name of Alexei Davydov et al. and is hereby incorporated by reference in its entirety.

FIELD

The present disclosure relates to wireless technology, and more specifically to techniques for control channel transmissions for NR based on a common search space.

BACKGROUND

Mobile communication has evolved significantly from early voice systems to today's highly sophisticated integrated communication platform. 4G (Fourth Generation) LTE (Long Term Evolution) networks are deployed in more than 100 countries to provide service in various spectrum band allocations depending on spectrum regime. Recently, significant momentum has started to build around the idea of a next generation, referred to as fifth generation (5G), wireless communications technology.

BRIEF DESCRIPTION OF THE DRAWINGS

FIG. 6 is a diagram illustrating an example scenario of beamformed transmission and reception between a TP and a UE in a 5G wireless system, in connection with various aspects described herein.

DETAILED DESCRIPTION

Figure 1:
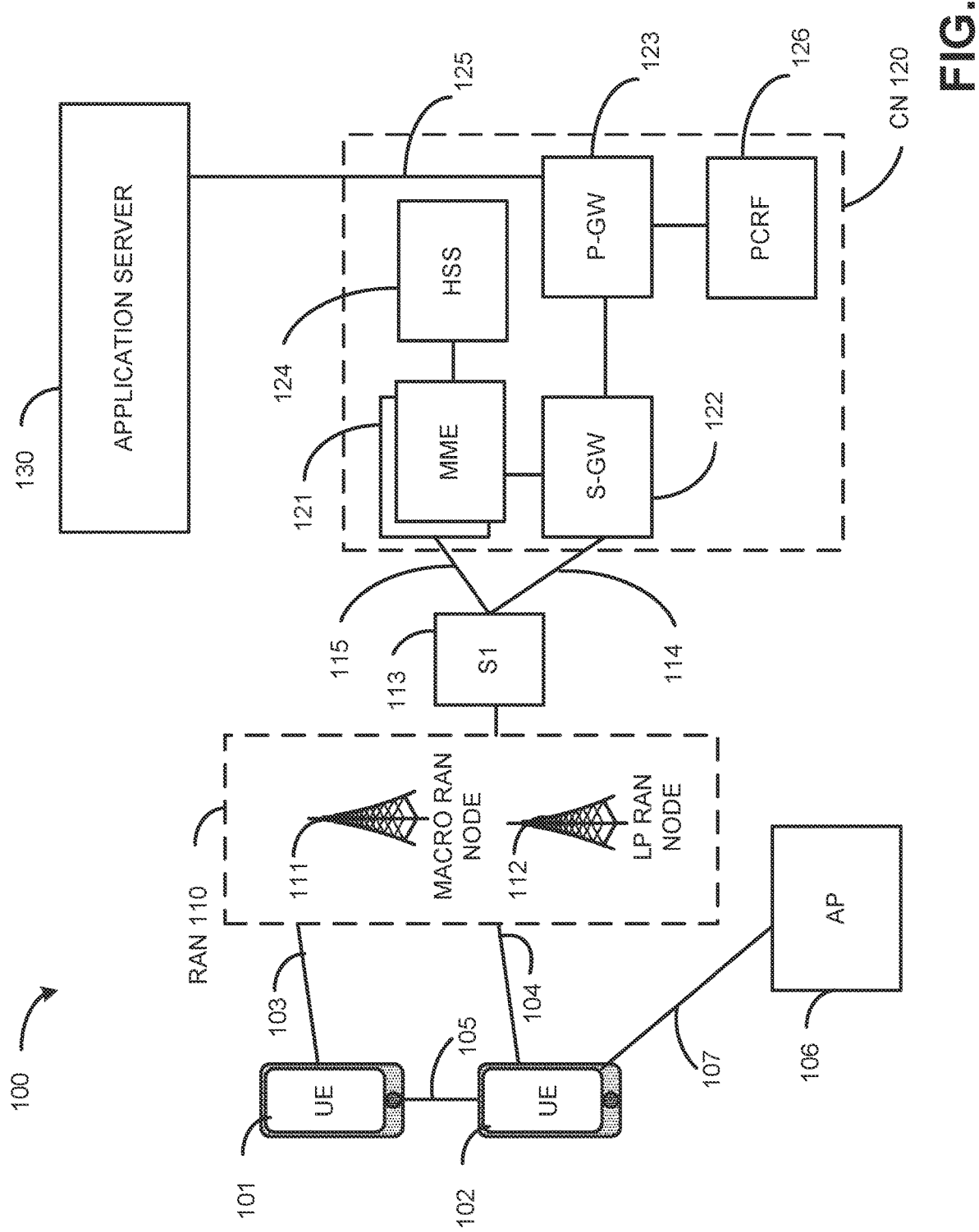
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124.

The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
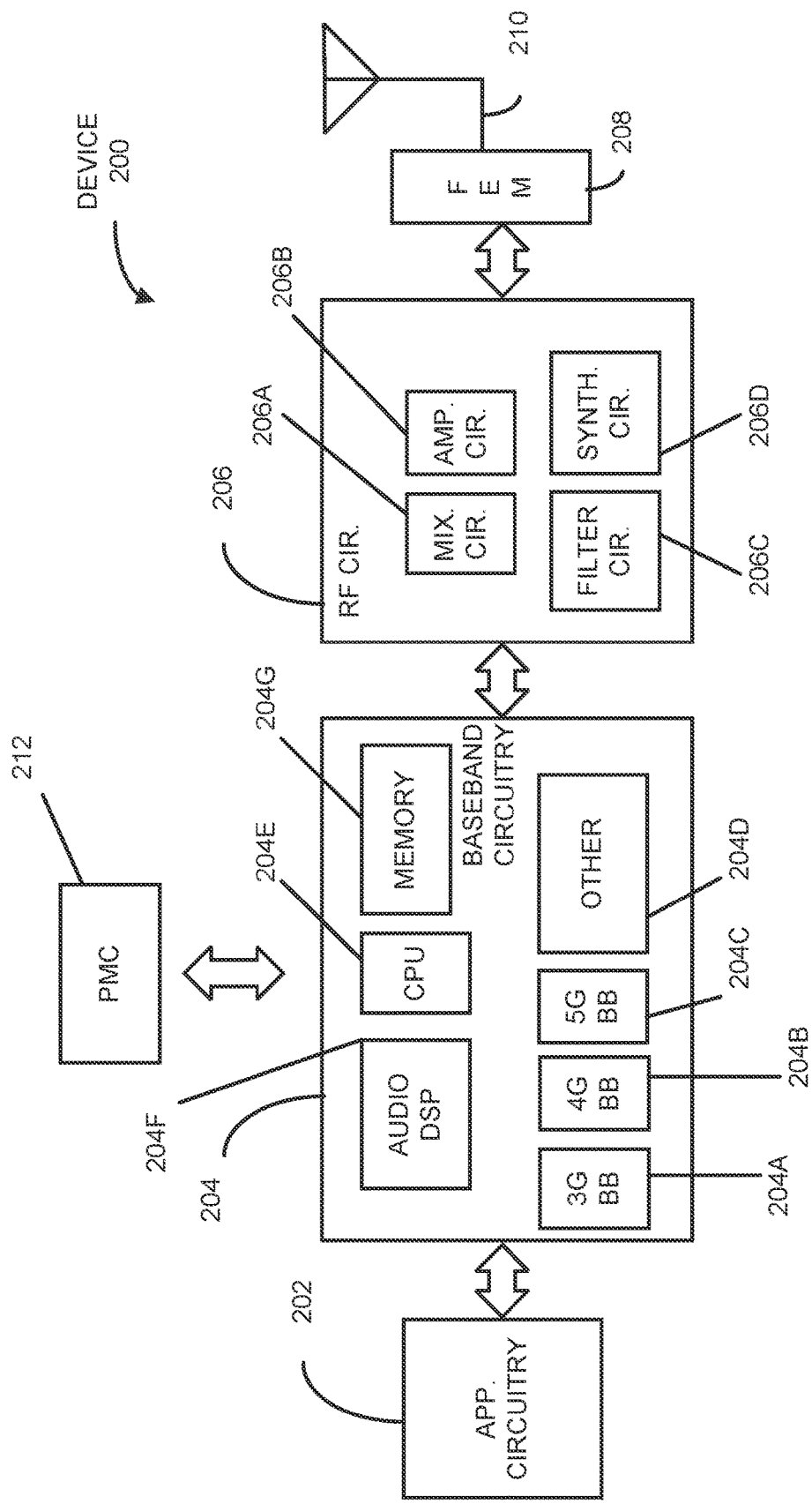
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 2 12 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
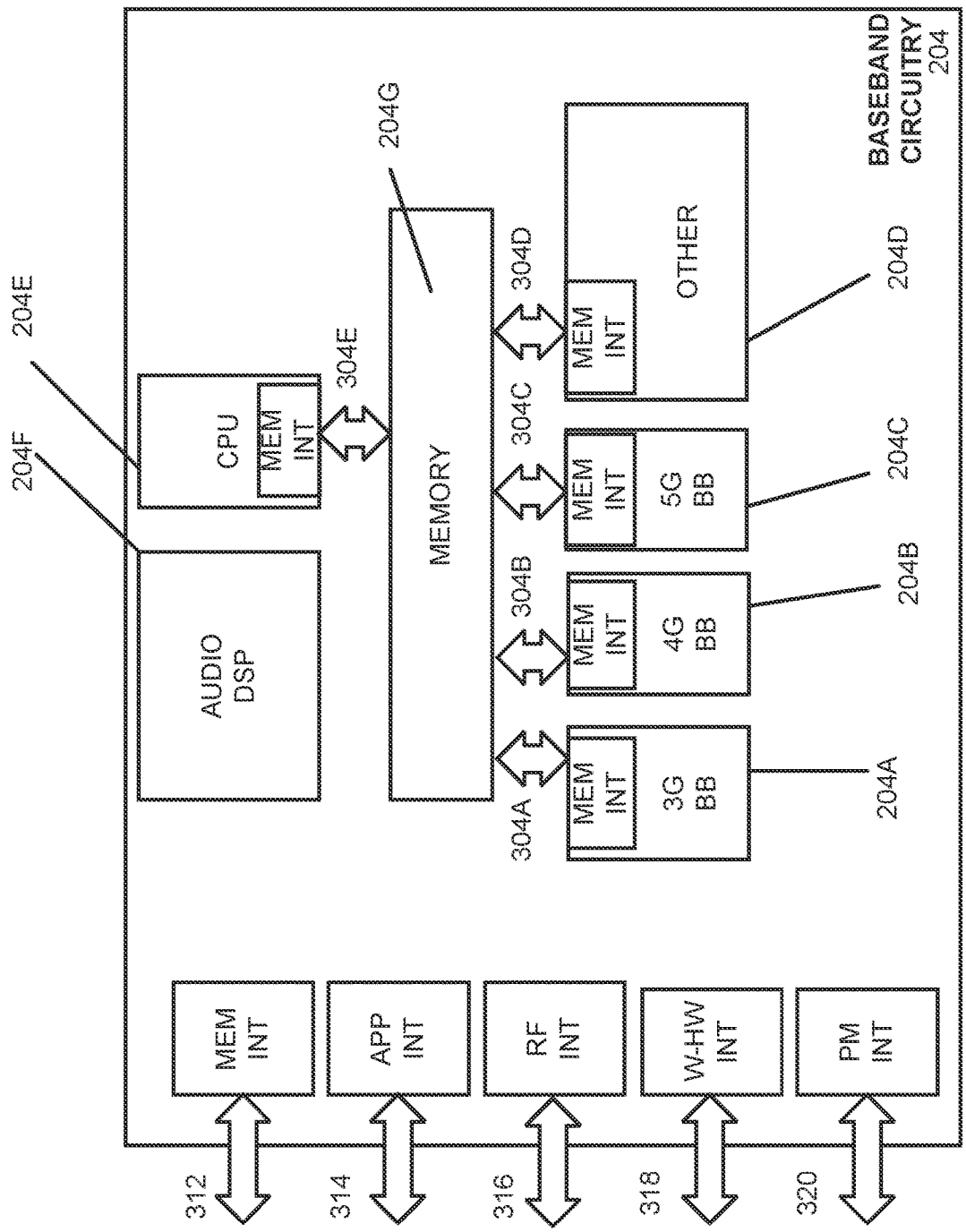
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
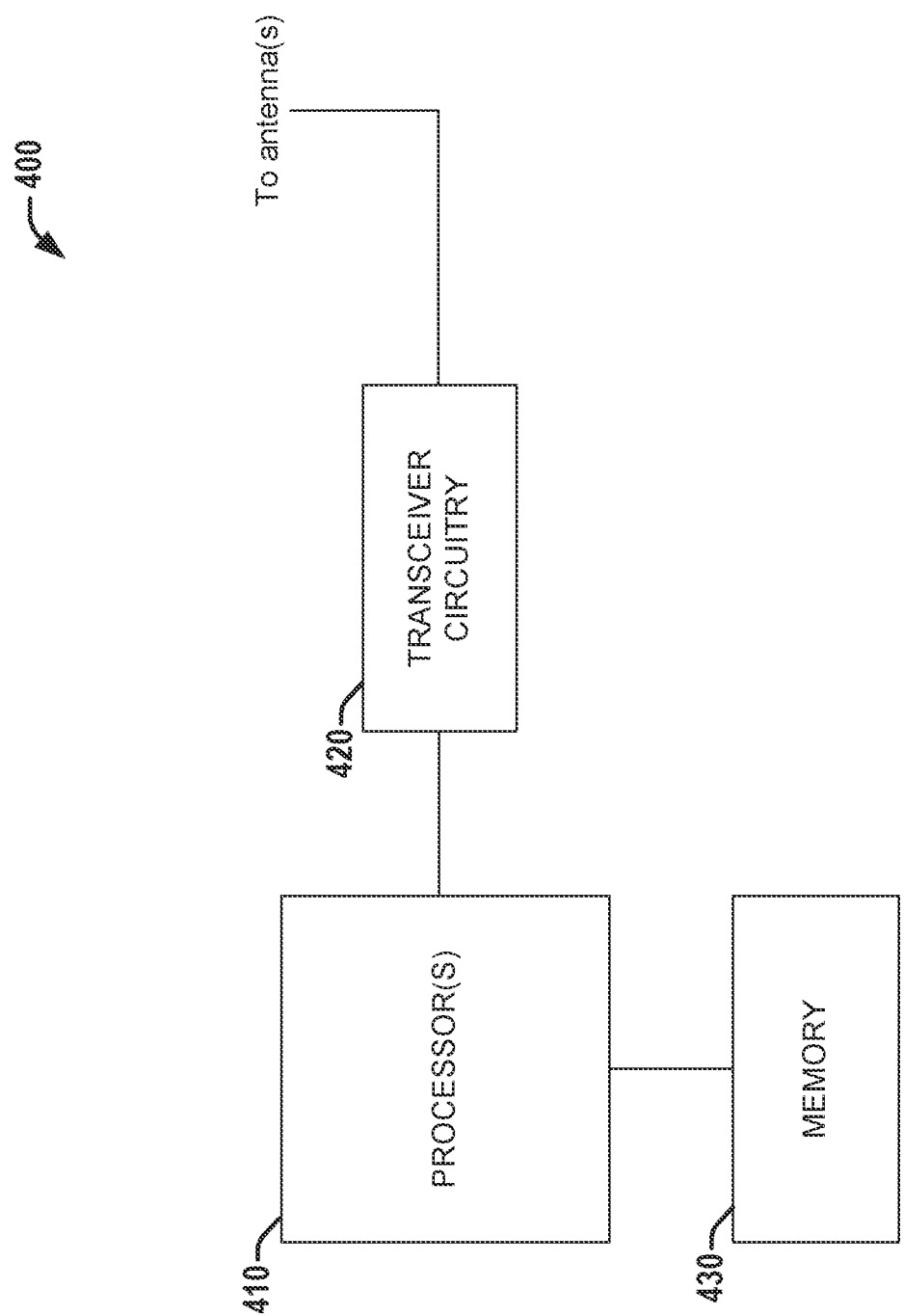
FIG. 4 is a block diagram illustrating a system employable at a UE (User Equipment) that facilitates reception of beamformed control channel transmissions, according to various aspects described herein.

In various aspects, techniques discussed herein can be employed to facilitate transmission and reception of a plurality of control channel sets corresponding to a common search space, where each such set can be associated with a distinct transmit beamforming at the BS (e.g., for a given set of OFDM (Orthogonal Frequency Division Multiplexing)/OFDMA (Orthogonal Frequency Division Multiple Access) symbols or slot, etc.). Additionally, in various aspects, techniques discussed herein can facilitate radio link monitoring (RLM) using a control channel corresponding to the common search space. Furthermore, in various aspects, UE-specific transmission of control information can be performed using common search space, which can facilitate scheduling of a fallback transmission without beamforming and/or fast beam acquisition based on the reported ACK/NACK for the different control channel sets Referring to FIG. 4, illustrated is a block diagram of a system 400 employable at a UE (User Equipment) that facilitates reception of beamformed control channel transmissions, according to various aspects described herein. System 400 can include one or more processors 410 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), transceiver circuitry 420 (e.g., comprising one or more of transmitter circuitry or receiver circuitry, which can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate reception of at least one control channel set of a plurality of control channel sets transmitted with a distinct beamforming for each control channel set of the plurality of control channel sets.

Figure 5:
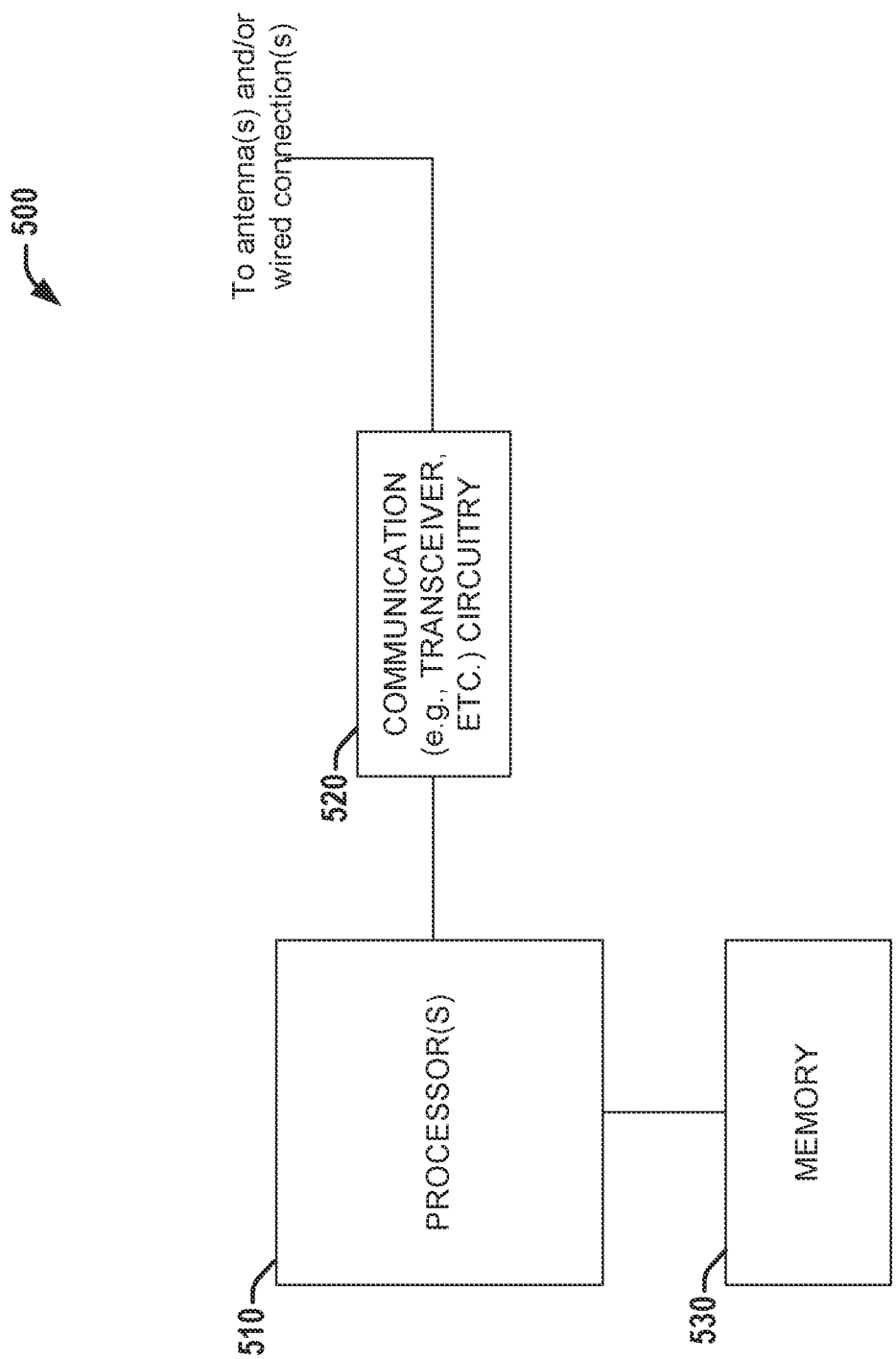
FIG. 5 is a block diagram illustrating a system employable at a BS (Base Station) that facilitates transmission of a plurality of control channel sets that each have a distinct beamforming, according to various aspects described herein.

Referring to FIG. 5, illustrated is a block diagram of a system 500 employable at a BS (Base Station) that facilitates transmission of a plurality of control channel sets that each have a distinct beamforming, according to various aspects described herein. System 600 can include one or more processors 510 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), communication circuitry 520 (e.g., which can comprise circuitry for one or more wired (e.g., X2, etc.) connections and/or transceiver circuitry that can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate generation of a plurality of control channel sets comprising one or more control channel sets over each of two or more symbols, wherein each control channel set of the plurality of control channel sets can be transmitted with a distinct beamforming.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor (s) 510, etc.) can comprise one or more of: identifying physical resources associated with the signal/message, detecting the signal/message, resource element group deinterleaving, demodulation, descrambling, and/or decoding.

In a 5G (Fifth Generation) system, both control and data channels at millimeter- or centimeter-wave frequency band can be characterized by a beamformed transmission. With beamforming, the antenna gain pattern is shaped like a cone pointing to a spatial area, so that a high antenna gain can be achieved. At the transmitter (e.g., of a UE employing system 400 and/or a BS employing system 500), beamforming can be achieved by applying a phase shift (e.g., via transceiver circuitry 420 and/or communication circuitry 520 of a phase shift selected by processor(s) 410 and/or processor(s) 510) to an antenna array that can be periodically arranged in 1D (One Dimensional) or 2D (Two Dimensional). Depending on the phase shift, multiple beams can be formed at a transmission point (TP) at the same time (e.g., via communication circuitry 520 based on beamforming weights selected by processor(s) 510), and beams from different TPs can point to the same location. Similarly, the receiver (e.g., of a UE employing system 400 and/or a BS employing system 500) can apply a phase shift (e.g., via transceiver circuitry 420 and/or communication circuitry 520 of a phase shift selected by processor(s) 410 and/or processor(s) 510) to its antenna array to achieve a large receive gain for a signal arriving from a specific spatial angle. Referring to FIG. 6, illustrated is an example scenario showing beamformed transmission and reception between a TP (e.g., employing system 500) and a UE (e.g., employing system 400) in a 5G wireless system, in connection with various aspects described herein. As shown in FIG. 6, the best receive signal quality can be achieved when transmit and receive beams are aligned.

To benefit from such a beamformed transmission, a UE (User Equipment, e.g., which can employ system 400) can perform measurement(s) on the available beam(s) received (e.g., via processor(s) 410 based on signals (e.g., reference signals) and/or interference received via transceiver circuitry 420) and can inform a BS (Base Station, e.g., a gNB or an eNB employing system 500, etc.) to use a beam that points to its location (e.g., as determined via the measurement(s)). In this way, the signal to interference and noise ratio (SINR) of the received signal can be improved. However, due to factors such as mobility of the UE, change(s) in the propagation environment, and/or rotation of the UE antenna(s), the beam direction that is best for the UE can be unknown and/or can be subject to change.

To support the transmission of downlink and uplink transport channels, physical layer control signaling can be employed (e.g., generated by processor(s) 510, transmitted via communication circuitry 520, received via transceiver circuitry 420, and processed by processor(s) 410). The control signaling can provide information about parameters of the physical data channel (e.g., generated by processor(s) 510, transmitted via communication circuitry 520, received via transceiver circuitry 420, and processed by processor(s) 410) that can facilitate successful reception of downlink data transmission(s) (e.g., generated by processor(s) 510, transmitted via communication circuitry 520, received via transceiver circuitry 420, and processed by processor(s) 410) or transmission of uplink data (e.g., generated by processor(s) 410, transmitted via transceiver circuitry 420, received via communication circuitry 520, and processed by processor(s) 510). Control channel information can be transmitted to the UE in a common search space or a UE-specific search space (e.g., either/both of which can be generated by processor(s) 510, transmitted via communication circuitry 520, received via transceiver circuitry 420, and processed by processor(s) 410). The UE-specific search space can carry control information specific to a UE, while the common search space can carry the common control information to all or multiple UEs in a cell. The MCS (Modulation and Coding Scheme) of the control channel supported in the common search space can typically be low compared to the MCS of the UE-specific search space, to provide the minimum coverage of the control channel transmission. The common search space can be used to carry important initial information such as paging information, system information, and/or random access procedures (e.g., processor(s) 510 can generate and communication circuitry 520 can transmit control channel messaging associated with any or all of these in the common search space). The common search space also can be used to transmit UE-specific control information to schedule downlink transmission (e.g., generated by processor(s) 510, transmitted via communication circuitry 520, received via transceiver circuitry 420, and processed by processor(s) 410) in a fallback transmission mode.

In various aspects, techniques discussed herein can be employed to facilitate control channel transmission (e.g., generated by processor(s) 510, transmitted via communication circuitry 520, received via transceiver circuitry 420, and processed by processor(s) 410) using a common search space in a system with multiple antennas. Analog beamforming can be employed (e.g., by communication circuitry 520 based on beamforming weights selected by processor(s) 510) for control channel transmission(s) discussed herein. Additionally, in various aspects, techniques can be employed to indicate a best beam using ACK/NACK feedback (e.g., generated by processor(s) 410, transmitted via transceiver circuitry 420, received via communication circuitry 520, and processed by processor(s) 510) on uplink resources corresponding to such a control channel transmission.

The control channel common search space can be defined as set of logical or physical resources that can be used to transmit control information to a UE or set of the UEs (e.g., generated by processor(s) 510, transmitted via communication circuitry 520, received via transceiver circuitry 420, and processed by processor(s) 410). In various aspects, a set of physical resources corresponding to the control channel set can be multiplexed in time, frequency or code domains. Each set can be transmitted using two or more symbols (e.g., OFDM (Orthogonal Frequency Division Multiplexing) symbols or symbols via related techniques, such as OFDMA (Orthogonal Frequency Division Multiple Access) or variations on OFDM/OFDMA, etc.) via transmit beamforming at the BS (e.g., with control signaling generated by processor(s) 510, transmitted via communication circuitry 520 with analog beamforming weights selected by processor(s) 510, received via transceiver circuitry 420 with analog beamforming weights selected by processor(s) 410, and processed by processor(s) 410).

In a first set of aspects, the control channel set with common search space may comprise two or more OFDM (e.g., or OFDMA, etc.; although specific examples discussed herein relate to OFDM, in various aspects OFDMA or variations on OFDM/OFDMA, etc. can also be employed) symbols, where the transmit beamforming applied on each OFDM symbol (e.g., by communication circuitry 520 based on beamforming weights selected by processor(s) 510) can be different.

Figure 7:
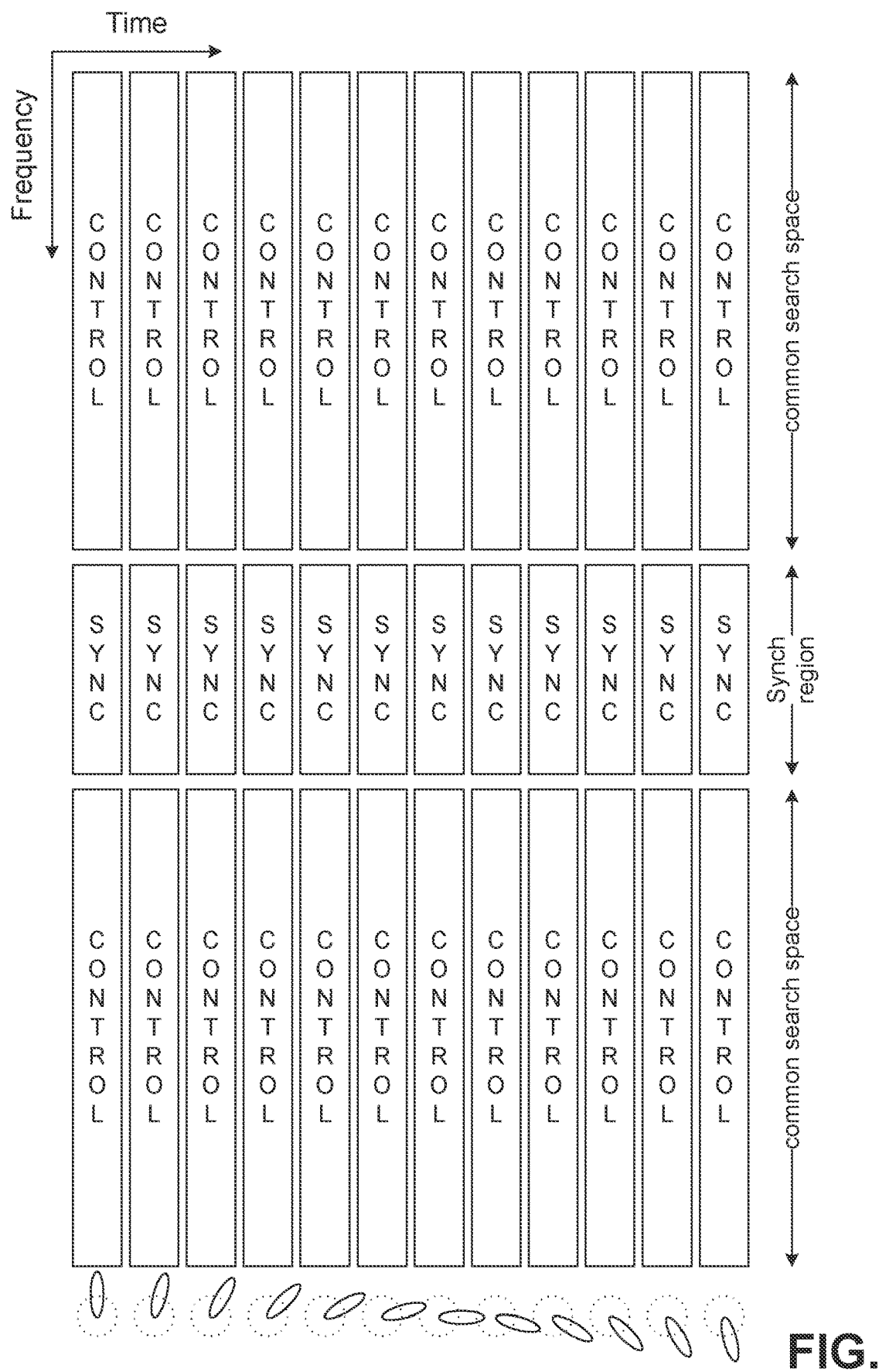
FIG. 7 is a diagram illustrating an example scenario wherein two distinct common search space control channel sets can be transmitted for each of a plurality of symbols, according to various aspects discussed herein.

In a second set of aspects, the transmit beamforming on the same OFDM symbol can also vary in the frequency domain (e.g., based on beamforming weights selected by processor(s) 510 and applied by communication circuitry 520) when more than one control channel set is multiplexed in the frequency domain. Referring to FIG. 7, illustrated is a diagram showing an example scenario wherein two distinct common search space control channel sets can be transmitted for each of a plurality of symbols, according to various aspects discussed herein. In the example of multiple control channel sets per symbol in FIG. 7, each of the control channel sets can be located in a DL (Downlink) slot carrying synchronization signals. As indicated by the example directions of the beams under each of the illustrated symbols, each OFDM (or OFDMA, etc.) symbol can be transmitted by the BS using different analog beamforming (e.g., based on beamforming weights selected by processor(s) 510 and applied by communication circuitry 520). Although not shown in FIG. 7, in various aspects, different numbers of control channel sets can be transmitted per symbol (e.g., 1 per symbol, more than 2 per symbol, etc.). Additionally, in aspects with two or more control channel sets per symbol, either the same beamforming can be applied (e.g., based on beamforming weights selected by processor(s) 510 and applied by communication circuitry 520) to each control channel set for that symbol (e.g., as in the example illustrated in FIG. 7), or distinct beamforming can be applied (e.g., based on beamforming weights selected by processor(s) 510 and applied by communication circuitry 520) to the distinct control channel sets for each symbol. In various aspects, the system information and/or paging control messages (e.g., generated by processor(s) 510) can be transmitted (repeated) (e.g., via communication circuitry 520) in every control channel set (or once for every symbol, in some aspects involving multiple control channel sets with a common beamforming per symbol) to provide transmission to different UEs (e.g., each of which can receive at least one of the control channel sets via its transceiver circuitry 420 and process that control channel set via its processor(s) 410).

Radio Link Monitoring (RLM) is a procedure that can be used to keep track of a radio link condition. According to various aspects discussed herein, the Radio Link Monitoring (RLM) can be performed by the UE using the control channel corresponding to the common search space (e.g., via measurements by processor(s) 410 based on signal(s) received via transceiver circuitry 420). In such aspects, Radio Link Failure (RLF) can be declared based on measurement(s) of the control channel corresponding to common search space (e.g., via measurements by processor(s) 410 based on signal(s) and/or interference received via transceiver circuitry 420), where the control channel measurements can comprise measurements on reference signals used for demodulation of the control channel. For example, a UE can determine (e.g., via processor(s) 410) a signal quality metric (e.g., SINR (Signal-to-Noise-plus-Interference Ratio), RSRQ (Reference Signal Received Quality), etc.) for each control channel set received (e.g., via transceiver circuitry 420) by the UE, and if each of the received control channel sets has a signal quality metric below a threshold level (e.g., as determined by processor(s) 410, wherein the threshold can be predetermined, configured via higher layer signaling, etc.) for a specified period of time (e.g., based on a timer, etc.) the UE can declare RLF.

Additionally, in various aspects, UE-specific control information (e.g., generated by processor(s) 510) can be transmitted (e.g., via communication circuitry 520) in the control channel region corresponding to common search space. The control information can be used to schedule (e.g., via control channel message(s) (e.g., DCI (Downlink Control Information) messages) generated by processor(s) 510, transmitted via communication circuitry 520, received via transceiver circuitry 420, and processed by processor(s) 410) DL or UL data transmission(s) to/from UEs in fallback transmission modes (e.g., transmission modes without a beamforming assumption at the UE and/or BS). In various aspects discussed herein, the control channel within the common search space also can be used to indicate (e.g., via control channel message(s) (e.g., DCI (Downlink Control Information) messages) generated by processor(s) 510, transmitted via communication circuitry 520, received via transceiver circuitry 420, and processed by processor(s) 410) the transmission beam configuration that will be applied for following physical channel transmission(s). In such scenarios, the overhead associated with BS beam sweep can be significantly reduced.

In the same or other aspects, control information transmission(s) (e.g., generated by processor(s) 510, transmitted via communication circuitry 520, received via transceiver circuitry 420, and processed by processor(s) 410) using the common search space can support fast beam acquisition at the BS (e.g., employing system 500). In such scenarios, a specific transmission beam from the BS to a given UE can be identified through ACK/NACK reports provided by the UE (e.g., generated by processor(s) 410, transmitted via transceiver circuitry 420, received via communication circuitry 520, and processed by processor(s) 510) in response to the control channel transmission (e.g., generated by processor(s) 510, transmitted via communication circuitry 520, received via transceiver circuitry 420, and processed by processor(s) 410) in the corresponding control channel set associated with that specific beam. Reception of the ACK or NACK (e.g., via communication circuitry 520) in response to a control information transmission in the given set can be used (e.g., by processor(s) 510) as an indication of the possible transmission beam.

Figure 8:
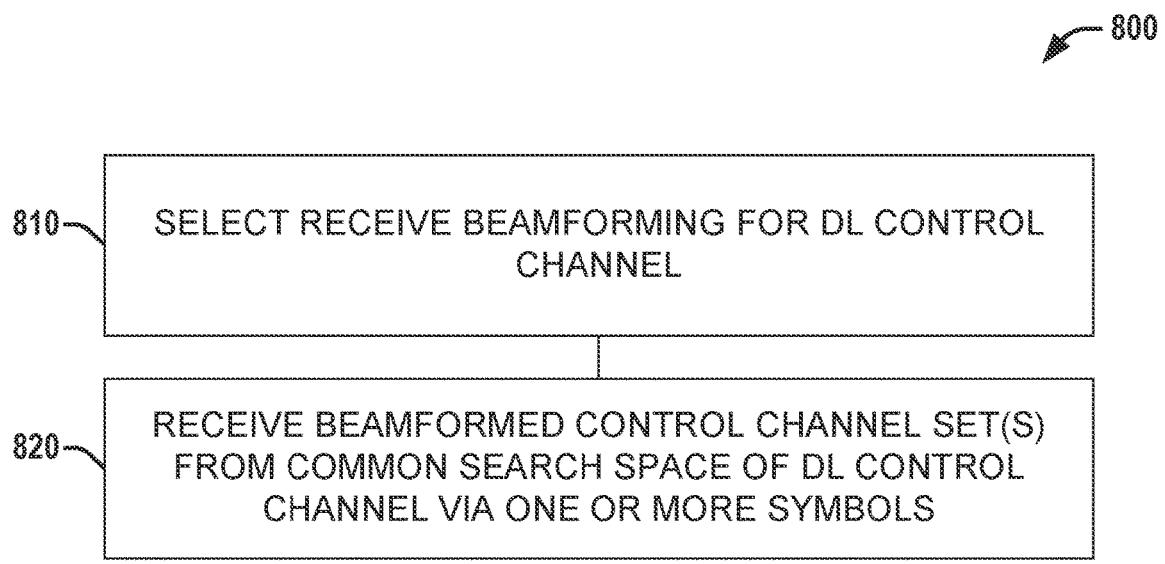
FIG. 8 is a flow diagram of an example method employable at a UE that facilitates reception of one or more common search space control channel sets that are each transmitted with distinct beamforming, according to various aspects discussed herein.

Referring to FIG. 8, illustrated is a flow diagram of an example method 800 employable at a UE that facilitates reception of one or more common search space control channel sets that are each transmitted with distinct beamforming, according to various aspects discussed herein. In other aspects, a machine readable medium can store instructions associated with method 800 that, when executed, can cause a UE to perform the acts of method 800.

At 810, a set of beamforming weights can be selected for receiving a DL (Downlink) control channel.

At 820, one or more beamformed control channel sets can be received from a common search space of the DL control channel via one or more symbols of a slot.

Additionally or alternatively, method 800 can include one or more other acts described herein in connection with system 400.

Figure 9:
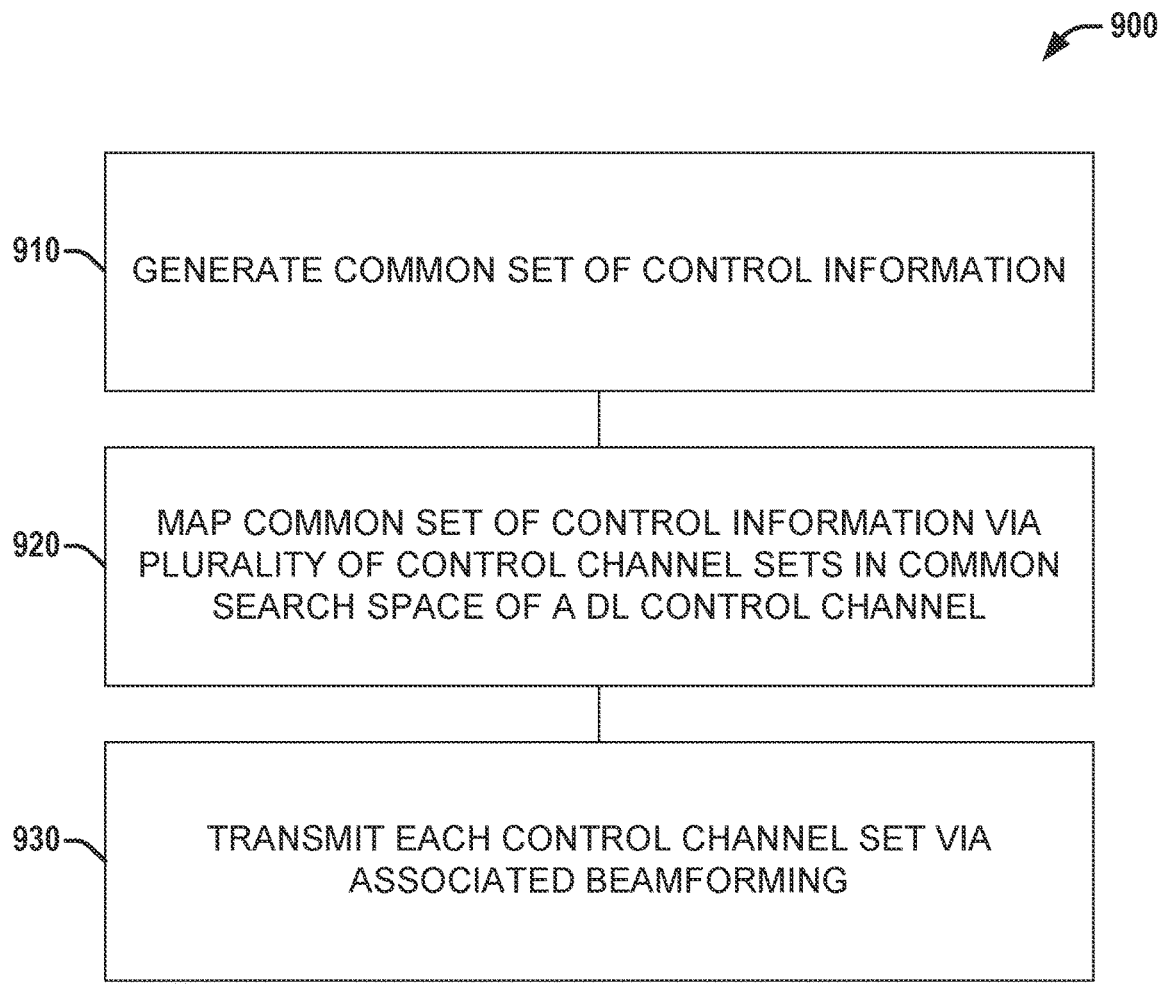
FIG. 9 is a flow diagram of an example method employable at a BS that facilitates transmission of one or more common search space control channel sets that are each transmitted with distinct beamforming, according to various aspects discussed herein.

Referring to FIG. 9, illustrated is a flow diagram of an example method 900 employable at a BS that facilitates transmission of one or more common search space control channel sets that are each transmitted with distinct beamforming, according to various aspects discussed herein. In other aspects, a machine readable medium can store instructions associated with method 900 that, when executed, can cause a BS to perform the acts of method 900.

At 910, a common set of control channel information can be generated.

At 920, the common set of control channel information can be mapped to a plurality of control channel sets in a common search space of a DL control channel.

At 930, each of the control channel sets can be transmitted with an associated beamforming.

Additionally or alternatively, method 900 can include one or more other acts described herein in connection with system 600.

In a first example technique, techniques discussed herein can be employed for control channel transmission using common search and beam sweeping. In the first example technique, a BS (e.g., eNB, gNB, etc.) can transmit (e.g., via communication circuitry 520) two or more control channel sets (e.g., generated by processor(s) 510), wherein each control channel set is associated with a specific beamforming at the BS (e.g., with analog beamforming weights selected by processor(s) 510 and applied by communication circuitry 520). Each of the two or more control channel sets can comprise common control information (e.g., generated by processor(s) 510.

In various aspects of the first example technique, the control channel sets can be transmitted in the downlink slot containing synchronization signals.

In various aspects of the first example technique, the control channel sets can be multiplexed in the time domain (e.g., via processor(s) 510 scheduling the control channel sets to different time domain resources).

In various aspects of the first example technique, the control channel sets can be multiplexed in the frequency domain (e.g., via processor(s) 510 scheduling the control channel sets to different frequency domain resources).

In various aspects of the first example technique, the control channel sets can be multiplexed in the code domain (e.g., via processor(s) 510 scheduling the control channel sets to different code domain resources (e.g., via applying a different CS (cyclic shift), etc.).

In various aspects of the first example technique or any variation thereon, the BS can transmit (e.g., via communication circuitry 520) control information for paging and system information (e.g., generated by processor(s) 510) to the UE(s) in the control channel with the common search space.

In various aspects of the first example technique or any variation thereon, the BS can transmit (e.g., via communication circuitry 520) unicast control information to the UE (e.g., which can receive the control information via transceiver circuitry 420 and process it via processor(s) 410) for downlink and uplink transmission (e.g., generated by communication circuitry 520) in the control channel with the common search space. In various such aspects, the BS can transmit (e.g., via communication circuitry 520) a beamforming configuration to the UE (e.g., which can receive the configuration(s) via transceiver circuitry 420 and process it via processor(s) 410) for other physical channels such as downlink or uplink data (e.g., via messaging generated by processor(s) 510) and/or reference signals such as CSI-RS (Channel State Information Reference Signals).

In various aspects of the first example technique or any variation thereon, the UE can perform radio link monitoring (e.g., via processor(s) 410 based on signals and/or interference received via transceiver circuitry 420) and reporting based on control channel sets (e.g., wherein transceiver circuitry 420 can transmit a report generated by processor(s) 410). In various such aspects, the UE can report radio link failure (e.g., wherein transceiver circuitry 420 can transmit a report generated by processor(s) 410) based on measurements (e.g., by processor(s) 410 of signals and/or interference received via transceiver circuitry 420) of the common search space control channel.

In various aspects of the first example technique or any variation thereon, the BS can determine (e.g., via processor(s) 510) the transmit beams from acknowledgement report(s) (e.g., HARQ (Hybrid Automatic Repeat Request) ACK (Acknowledgment)/NACK (Negative Acknowledgment)) received from the UE in response to the transmission of the control channel sets.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a User Equipment (UE), comprising: a memory interface; and processing circuitry configured to: select a set of receive beamforming weights for a DL (Downlink) control channel; decode one or more control channel sets from a common search space of the DL control channel, wherein each control channel set of the one or more control channel sets is mapped to an associated symbol of one or more symbols of a slot, wherein each control channel set of the one or more control channel sets has an associated transmit beamforming, and wherein each control channel set of the one or more control channel sets comprises a common set of control information; and send the set of receive beamforming weights to a memory via the memory interface.

Example 2 comprises the subject matter of any variation of any of example(s) 1, wherein the associated transmit beamforming for each control channel set is different than the associated transmit beamforming for any control channel set of the one or more control channel sets that is mapped to a different associated symbol than the associated symbol that control channel set is mapped to.

Example 3 comprises the subject matter of any variation of any of example(s) 1, wherein the associated transmit beamforming for each control channel set of the one or more control channel sets is distinct from the associated transmit beamforming of each other control channel set of the one or more control channel sets.

Example 4 comprises the subject matter of any variation of any of example(s) 1-3, wherein the slot comprises a set of synchronization signals.

Example 5 comprises the subject matter of any variation of any of example(s) 1-3, wherein the one or more control channel sets comprise two or more control channel sets multiplexed in a time domain.

Example 6 comprises the subject matter of any variation of any of example(s) 1-3, wherein the one or more control channel sets comprise two or more control channel sets multiplexed in a frequency domain.

Example 7 comprises the subject matter of any variation of any of example(s) 1-3, wherein the one or more control channel sets comprise two or more control channel sets multiplexed in a code domain.

Example 8 comprises the subject matter of any variation of any of example(s) 1-3, wherein the common set of control information comprises at least one of paging information or system information.

Example 9 comprises the subject matter of any variation of any of example(s) 1-3, wherein the common set of control information comprises UE-specific control information.

Example 10 comprises the subject matter of any variation of any of example(s) 9, wherein the common set of control information comprises at least one of a beamforming configuration for an UL (Uplink) data channel, a beamforming configuration for a DL data channel, or a set of CSI (Channel State Information)-RS (Reference Signals).

Example 11 comprises the subject matter of any variation of any of example(s) 1-3, wherein the processing circuitry is further configured to: measure a signal quality metric associated with each control channel set of the one or more control channel sets; and perform RLM (Radio Link Monitoring) based on the signal quality metric associated with each control channel set of the one or more control channel sets.

Example 12 comprises the subject matter of any variation of any of example(s) 11, wherein the processing circuitry is further configured to generate a RLF (Radio Link Failure) report based on a determination that the signal quality metric associated with each control channel set of the one or more control channel sets is below a threshold.

Example 13 comprises the subject matter of any variation of any of example(s) 1-3, wherein the processing circuitry is further configured to generate HARQ (Hybrid Automatic Repeat Request) ACK (Acknowledgment)/NACK (Negative Acknowledgment) feedback based on the one or more control channel sets.

Example 14 comprises the subject matter of any variation of any of example(s) 1-7, wherein the common set of control information comprises at least one of paging information or system information.

Example 15 comprises the subject matter of any variation of any of example(s) 1-8, wherein the common set of control information comprises UE-specific control information.

Example 16 is an apparatus configured to be employed in a next generation NodeB (gNB), comprising: a memory interface; and processing circuitry configured to: generate a common set of control channel information; map the common set of control channel information to two or more control channel sets in a common search space of a DL (Downlink) control channel, wherein each of the two or more control channel sets is mapped to an associated symbol of two or more symbols of a slot; select an associated set of transmit beamforming weights for each control channel set of the two or more control channel sets; and send the common set of control information to a memory via the memory interface.

Example 17 comprises the subject matter of any variation of any of example(s) 16, wherein, for each control channel set of the two or more control channel sets, the associated set of transmit beamforming weights for that control channel set is distinct from the associated set of transmit beamforming weights for each other control channel set of the two or more control channel sets.

Example 18 comprises the subject matter of any variation of any of example(s) 16, wherein, for each control channel set of the two or more control channel sets, the associated set of transmit beamforming weights for that control channel set is a common set of transmit beamforming weights for the associated symbol that control channel set is mapped to.

Example 19 comprises the subject matter of any variation of any of example(s) 16-18, wherein the processing circuitry is further configured to multiplex the two or more control channel sets in a time domain.

Example 20 comprises the subject matter of any variation of any of example(s) 16-18, wherein the processing circuitry is further configured to multiplex the two or more control channel sets in a frequency domain.

Example 21 comprises the subject matter of any variation of any of example(s) 16-18, wherein the processing circuitry is further configured to multiplex the two or more control channel sets in a code domain.

Example 22 comprises the subject matter of any variation of any of example(s) 16-18, wherein the processing circuitry is further configured to: generate a set of synchronization signals; and map the set of synchronization signals to each symbol of the two or more symbols.

Example 23 comprises the subject matter of any variation of any of example(s) 16-18, wherein the processing circuitry is further configured to: process HARQ (Hybrid Automatic Repeat Request) ACK (Acknowledgment)/NACK (Negative Acknowledgment) feedback associated with at least one of the two or more control channel sets; and select a transmit beamforming for a DL data channel based at least in part on the HARQ ACK/NACK feedback.

Example 24 is a machine readable medium comprising instructions that, when executed, cause a User Equipment to: select a set of receive beamforming weights for a DL (Downlink) control channel; and receive one or more control channel sets from a common search space of the DL control channel, wherein each control channel set of the one or more control channel sets is mapped to an associated symbol of one or more symbols of a slot, wherein each control channel set of the one or more control channel sets has an associated transmit beamforming, and wherein each control channel set of the one or more control channel sets comprises a common set of control information.

Example 25 comprises the subject matter of any variation of any of example(s) 24, wherein the slot comprises a set of synchronization signals.

Example 26 comprises the subject matter of any variation of any of example(s) 24-25, wherein the one or more control channel sets comprise two or more control channel sets multiplexed in a time domain.

Example 27 comprises the subject matter of any variation of any of example(s) 24-25, wherein the one or more control channel sets comprise two or more control channel sets multiplexed in a frequency domain.

Example 28 comprises the subject matter of any variation of any of example(s) 24-25, wherein the one or more control channel sets comprise two or more control channel sets multiplexed in a code domain.

Example 29 is an apparatus configured to be employed in a User Equipment (UE), comprising: means for selecting a set of receive beamforming weights for a DL (Downlink) control channel; and means for receiving one or more control channel sets from a common search space of the DL control channel, wherein each control channel set of the one or more control channel sets is mapped to an associated symbol of one or more symbols of a slot, wherein each control channel set of the one or more control channel sets has an associated transmit beamforming, and wherein each control channel set of the one or more control channel sets comprises a common set of control information.

Example 30 comprises the subject matter of any variation of any of example(s) 29, wherein the slot comprises a set of synchronization signals.

Example 31 comprises the subject matter of any variation of any of example(s) 29-30, wherein the one or more control channel sets comprise two or more control channel sets multiplexed in a time domain.

Example 32 comprises the subject matter of any variation of any of example(s) 29-30, wherein the one or more control channel sets comprise two or more control channel sets multiplexed in a frequency domain.

Example 33 comprises the subject matter of any variation of any of example(s) 29-30, wherein the one or more control channel sets comprise two or more control channel sets multiplexed in a code domain.

Example 34 comprises an apparatus comprising means for executing any of the described operations of examples 1-33.

Example 35 comprises a machine readable medium that stores instructions for execution by a processor to perform any of the described operations of examples 1-33.

Example 36 comprises an apparatus comprising: a memory interface; and processing circuitry configured to: performing any of the described operations of examples 1-33.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A base station (BS), comprising:
    one or more processors configured to:
    generate a control channel information set mapped to a plurality of control channel sets;
    map the plurality of control channel sets to a common search space associated with sets of one or two orthogonal frequency-division multiplexing (OFDM) symbols in a slot; and
    map a set of synchronization signals to symbols of the sets of one or two OFDM symbols.

2. The BS of claim 1, wherein the plurality of control channel sets comprises one or more of a system information or a paging message.

3. The BS of claim 1, wherein mapping the set of synchronization signals includes multiplexing respective portions of the common search space and the set of synchronization signals in a frequency domain.

4. The BS of claim 1, wherein the sets of one or two OFDM symbols comprises two OFDM symbols and wherein a transmit beamforming for each symbol of the two OFDM symbols are different.

5. The BS of claim 1, wherein a synchronization signal of the set of synchronization signals associated with a subset of the sets of one or two OFDM symbols is also associated with a respective portion of the common search space wherein the respective portion of the common search space and the subset of the sets of one or two OFDM symbols have a same transmit beamforming.

6. The BS of claim 1, wherein the plurality of control channel sets are in a common search space of a downlink (DL) control channel.

7. The BS of claim 1, wherein mapping the set of synchronization signals includes multiplexing respective portions of the common search space and the set of synchronization signals in a time domain.

8. The BS of claim 1, wherein a different number of the plurality of control channel sets are mapped to two or more of the sets of one or two OFDM symbols.

9. A User Equipment (UE) comprising
    one or more processors configured to:
    receive a plurality of control channel sets, wherein the plurality of control channel sets are mapped to a common search space associated with sets of one or two orthogonal frequency-division multiplexing (OFDM) symbols in a slot;
    detect a control channel information set that is mapped to the plurality of control channel sets; and
    detect a set of synchronization signals mapped to symbols of the sets of one or two OFDM symbols.

10. The UE of claim 9, wherein the plurality of control channel sets comprises one or more of a system information or a paging message.

11. The UE of claim 9, wherein the set of synchronization signals are multiplexed with respective portions of the common search space in a frequency domain.

12. The UE of claim 9, wherein the set of synchronization signals are multiplexed with respective portions of the common search space in a time domain.

13. The UE of claim 9, wherein a synchronization signal of the set of synchronization signals associated with a subset of the sets of one or two OFDM symbols is also associated with a respective portion of the common search space wherein the respective portion of the common search space and the subset of the sets of one or two OFDM symbols have a same transmit beamforming.

14. The UE of claim 9, wherein the plurality of control channel sets are received in a common search space of a downlink (DL) control channel.

15. The UE of claim 9, wherein a different number of the plurality of control channel sets are mapped to two or more of the sets of one or two orthogonal OFDM symbols.

16. A baseband processor configured to:
    generate a set of control channel information mapped to a plurality of control channel sets;
    map the plurality of control channel sets to a common search space associated with sets of one or two symbols; and
    map a set of synchronization signals to symbols of the sets of one or two symbols wherein mapping the set of synchronization signals includes multiplexing with the common search space in a frequency domain.

17. The baseband processor of claim 16, wherein the plurality of control channel sets comprises one or more of a system information or a paging message.

18. The baseband processor of claim 17, wherein the sets of one or two symbols comprises two OFDM symbols and wherein a transmit beamforming for each symbol of the two OFDM symbols are different.

19. The baseband processor of claim 16, wherein a synchronization signal of the set of synchronization signals associated with a subset of the sets of one or two symbols is also associated with a respective portion of the common search space wherein the respective portion of the common search space and the subset of the sets of one or two symbols have a same transmit beamforming.

20. The baseband processor of claim 19, wherein a different number of the plurality of control channel sets are mapped to two or more of the sets of one or two symbols.

* * * * *